US005625520A

United States Patent [19]

Lim

[11] Patent Number: 5,625,520

[45] Date of Patent: Apr. 29, 1997

[54] DEVICE FOR PREVENTING A HIGH VOLTAGE TRANSFORMER OF A MICROWAVE OVEN FROM BEING OVERHEATED

[75] Inventor: Byung Kap Lim, Seoul, Rep. of Korea

[73] Assignee: Daewoo Electronics Co., Ltd., Seoul, Rep. of Korea

[21] Appl. No.: 341,861

[22] Filed: Nov. 15, 1994

[30] Foreign Application Priority Data

Nov. 19, 1993 [KR] Rep. of Korea ........................ 93-24724
Nov. 19, 1993 [KR] Rep. of Korea ........................ 93-24739

[51] Int. Cl.$^6$ ........................ H02H 5/04

[52] U.S. Cl. ........................ 361/103; 361/37

[58] Field of Search ........................ 361/103, 37; 219/481, 219/710, 716

[56] References Cited

U.S. PATENT DOCUMENTS

| | | | |
|---|---|---|---|
| 3,717,793 | 2/1973 | Peterson | 361/103 |
| 4,454,554 | 6/1984 | Coleman | 361/41 |
| 4,812,798 | 3/1989 | Chappel | 336/98 |

FOREIGN PATENT DOCUMENTS

| | | |
|---|---|---|
| 419832 | 3/1991 | European Pat. Off. . |
| 433158 | 6/1991 | European Pat. Off. . |
| 2380653 | 8/1978 | France . |
| 3741381 | 1/1990 | Germany . |
| 1383789 | 2/1975 | United Kingdom . |

*Primary Examiner*—Jeffrey A. Gaffin
*Assistant Examiner*—Sally C. Medley
*Attorney, Agent, or Firm*—Oliff & Berridge

[57] ABSTRACT

Disclosed is a device for preventing a high voltage transformer of a microwave oven from being overheated, which directly senses a temperature in a second coil of the high voltage transformer of the microwave oven and thereby supplies or cuts off power to the transformer according to the temperature. In the device, a thermostat is opened/closed according to the temperature of the second coil of the transformer so as to regulate power supply to the first coil of the transformer, and accordingly the transformer is prevented from being overheated.

9 Claims, 4 Drawing Sheets

DEVICE FOR PREVENTING A HIGH VOLTAGE TRANSFORMER OF A MICROWAVE OVEN FROM BEING OVERHEATED

BACKGROUND OF THE INVENTION

1. Field of the Invention

The present invention relates to a device for preventing a high voltage transformer of a microwave oven from being overheated, which directly senses a temperature in a second coil of the high voltage transformer of the microwave oven and thereby supplies or cuts off power to the transformer according to the temperature.

2. Prior Art

A microwave oven is a cooker for heating food by a high frequency electric field, which includes a heating chamber and a machine chamber. In the microwave oven, a magnetron and a high voltage transformer are disposed in the machine chamber. The high voltage transformer applies a high voltage to the magnetron to make the magnetron generate ultra microwaves, and the magnetron irradiates the ultra microwaves into the heating chamber so as to activate molecular movements in the food put in the heating chamber, so that the food is heated.

In the meantime, the high voltage transformer has a large quantity of coils which generate a large quantity of heat when the transformer is operated. Accordingly, the operation efficiency of the microwave oven is lowered and components of the microwave oven can be damaged when the machine chamber is overheated due to the heat generated from the coils. Further, there is a possibility of danger that the microwave oven will catch a fire.

Therefore, proper means for preventing a high voltage transformer of a microwave oven from being overheated when operated has been required, and particularly International Electrotechnical Commission (IEC) regulates that the temperature of the high voltage transformer of the microwave oven should not be over 210 Celsius degree.

FIG. 5 is a circuit diagram of a conventional device for preventing the temperature in the machine chamber of a microwave oven from being over-elevated as described above. As shown, a high voltage transformer T1 has a first coil L1 to which an alternating current voltage is applied, and a second coil L2 at which a circuit including a high voltage fuse F1, a high voltage condenser C1, a high voltage diode D1, and a magnetron M1 is constructed.

In the device for preventing machine chamber of a microwave oven from being overheated as described above, high voltage fuse F1 is cut off or high voltage diode D1 is shorted before high voltage fuse F1 is cut off, when an overcurrent flows through the second circuit L2. When high voltage diode D1 is shorted before high voltage fuse F1 is cut off, a closed loop comprising second coil L2, high voltage fuse F1, high voltage condenser C1, and high voltage diode D1 is constructed. At this moment, a large quantity of currents abruptly flow in this closed loop, and thereby high voltage fuse F1 is cut off.

When high voltage fuse F1 is cut off, power supply to second coil L2 of high voltage transformer T1 is ceased so as to prevent transformer F1 from being overheated and accordingly catching a fire, and at the same time the operation of magnetron M1 is stopped.

However, in the conventional device for preventing a high voltage transformer of a microwave oven from being overheated having the above-described construction, the temperature of the high voltage transformer is not directly sensed but indirectly preestimated through the electric currents flowing therethrough, and accordingly there is a disadvantage that the temperature of the high voltage transformer is not prevented precisely and efficiently from being over-elevated and there is a possibility of danger that the electric current can be cut off by a current over-inflowing through the fuse, even when the high voltage transformer is not overheated. Further, in the conventional device, whenever the high voltage diode is shorted and/or the high voltage fuse is cut off, these damaged components, which are very expensive, must be replaced with new ones to operate the transformer again, and thereby the maintenance expense is relatively very high.

SUMMARY OF THE INVENTION

The present invention has been made to overcome the above-described disadvantages of the conventional device, and accordingly it is an object of the present invention to provide a device for preventing a high voltage transformer of a microwave oven from being overheated, which directly senses a temperature in a second coil of the high voltage transformer of the microwave oven and regulates power supply to a second coil of the transformer according to the temperature so as to prevent the temperature of the high voltage transformer from being over-elevated precisely and efficiently and to ensure a stable operation of the transformer, and which can be manufactured and maintained at a low expense.

To achieve the above object, the present invention provides a device for preventing a high voltage transformer of a microwave oven from being overheated comprising:

a high voltage transformer having a first coil to which an alternating current is supplied, and a second coil at which a voltage higher than that of the first coil is induced;

a generator circuit for generating an ultra microwave by the voltage applied thereto from the second coil, and for radiating the ultra microwave into a heating chamber of the microwave oven; and a thermostat connected to one of two terminals of the first coil and disposed on the outer surface of the second coil.

Preferably, the generator circuit includes a magnetron electrically connected to the second coil to radiate an ultra microwave into a heating chamber of the microwave oven, a condenser disposed between the magnetron and the second to be connected in series to them, and a high voltage diode connected in parallel to the magnetron.

According to one embodiment of the present invention, the thermostat is inserted in a bracket for the electric insulation thereof from second coil, wherein the bracket is made of a material having a high insulation property such as polybuthylene terephtalate or a Phenol resin and attached on an outer surface of second coil, and the bracket includes a main body having a recess formed at the central part thereof, a base plate supporting the main body and having a rear surface which is curved in such a manner to be suitably attached on an outer surface of the high voltage transformer, a crossing bar crossing over the recess for pressing down the thermostat in the recess, and a bolt or a screw inserted through one end of the crossing bar to be engaged in the screw hole.

According to another embodiment of the present invention, the bracket includes a main body having a recess formed at the central part thereof, a base plate supporting the main body and having a rear surface which is curved in such a manner to be suitably attached on an outer surface of the high voltage transformer, and two elastic hooks disposed in the recess, each of the hooks having a protuberance formed at an upper free end thereof, and a reinforcement girder provided at a rear surface thereof.

In a device for preventing a high voltage transformer of a microwave oven from being overheated according to the present invention, two contact points of the thermostat are maintained to be connected with each other so as to guarantee stable power supply to the first coil and thereby normal operations of the high voltage transformer and the magnetron. In the meantime, when the high voltage transformer is overheated to be over a predetermined temperature, the two contact points are separated from each other and the power supply to the first coil is interrupted, and accordingly the normal operations of the high voltage transformer and the magnetron are stopped. Again, when the high voltage transformer is cooled to be below the predetermined temperature, the two contact points are restored to be connected with each other, and thereby the electric power is supplied to the first coil again.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENTS

Hereinafter, the preferred embodiments of the present invention will be described in detail with reference to the drawings.

Figure 1:
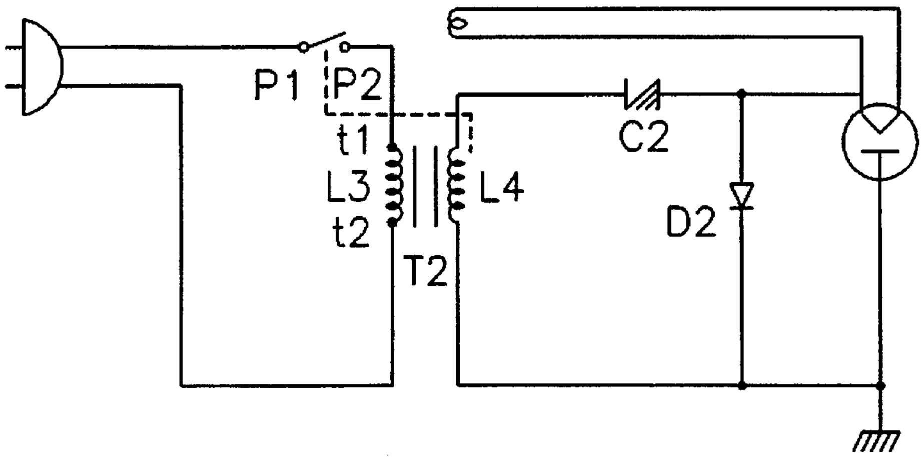
FIG. 1 is a circuit diagram of a device for preventing a high voltage transformer of a microwave oven from being overheated according to one embodiment of the present invention.
Figure 5:
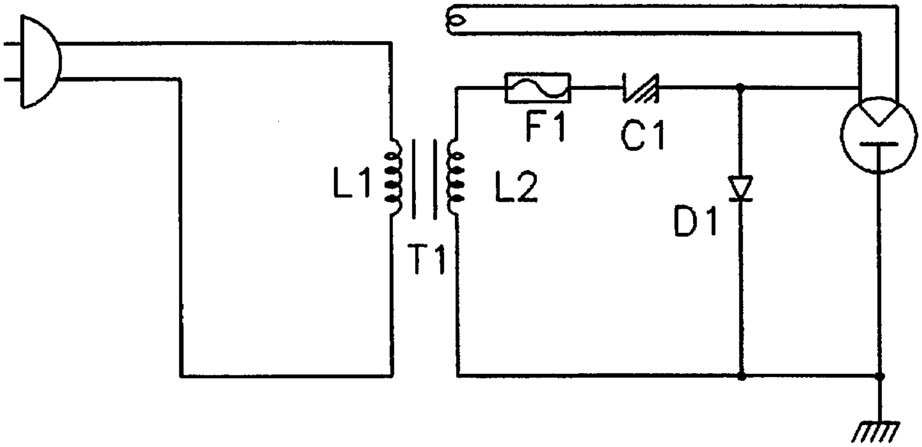
FIG. 5 (PRIOR ART)
FIG. 5 is a circuit diagram of a conventional device for preventing the temperature in the machine chamber of a microwave oven from being over-elevated.

FIG. 1 is a circuit diagram of a device for preventing a high voltage transformer of a microwave oven from being overheated according to one embodiment of the present invention. As shown in FIG. 1, a high voltage transformer T2 has a first coil L3 to which an alternating current voltage is applied, and a second coil L4 at which a circuit including a high voltage condenser C2, a high voltage diode D2, and a magnetron M2 is constructed. Magnetron M2 is connected in parallel to high voltage diode D2.

Meanwhile, a thermostat TH is connected to one of two terminals t1, t2 of first coil L3 of high voltage transformer T2 to which an alternating current of low voltage is supplied therethrough.

Figure 2:
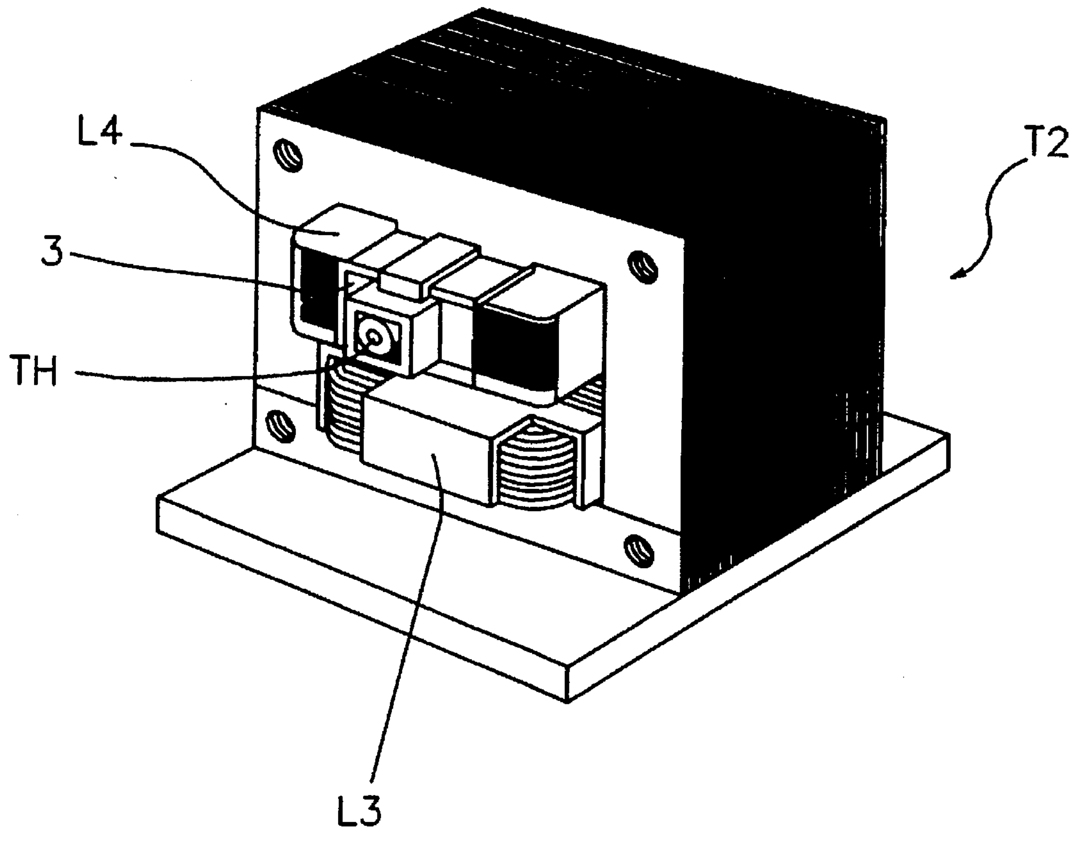
FIG. 2 is a perspective view of a high voltage transformer having a thermostat on a second coil thereof according to the embodiment shown in FIG. 1.

Thermostat TH is directly disposed on the outer surface of second coil L4 of high voltage transformer T2 to sense the temperature of high voltage transformer T2 as shown in FIG. 2 because a component generating the largest quantity of heat in high voltage transformer T2 is second coil L4 the number of the windings of which is relatively large, and thermostat TH regulates power supply to first coil L3 according to the temperature. In this case, a bracket 3 is attached to second coil L4, after which thermostat TH is inserted into the bracket 3 in order to be electrically insulated from second coil L4 and fixed to the bracket 3 through assembling means such as a bolt or a screw.

Bracket 3 comprises a material having a high insulation property such as polybutylene terephthalate (PBT) or a phenol resin and attached on the outer surface of second coil L4.

Figure 3A:
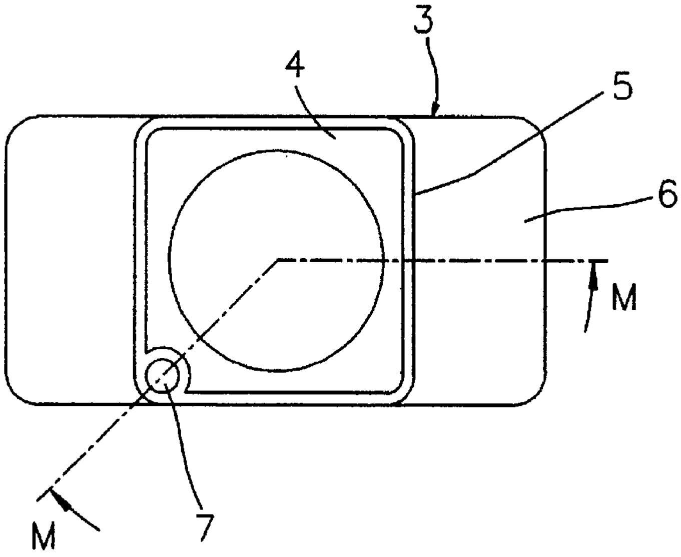
FIG. 3A is a plan view of the bracket shown in FIG. 2.
Figure 3B:
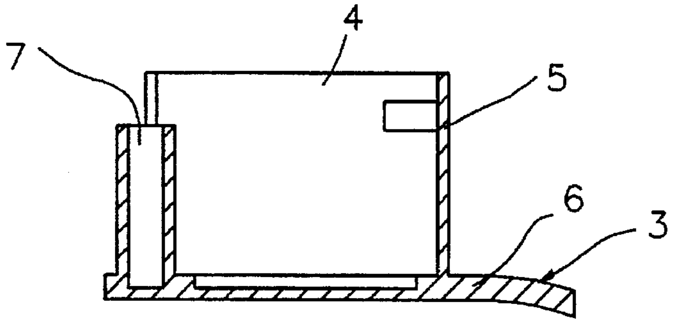
FIG. 3B is a sectional view of the bracket taken along line M—M in FIG. 3A.

FIGS. 3A and 3B are plan and sectional views of a bracket 3 according to one embodiment of the present invention. As shown, bracket 3 has a main body 5 and a base plate 6. Main body 5 has a recess 4 formed at the central part thereof and a screw hole 7 formed at an inner corner thereof. The rear surface of base plate 6 is curved in such a manner to be attached to the outer surface of high voltage transformer T2 suitably.

Figure 3C:
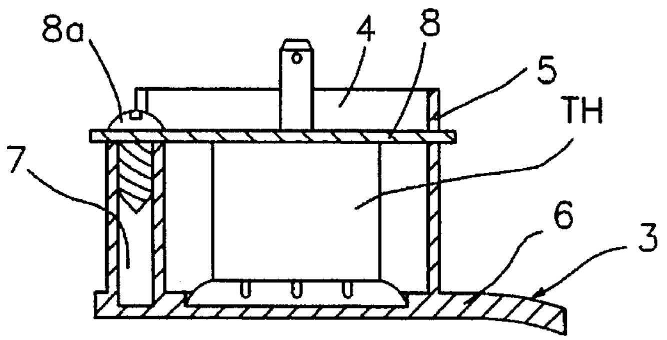
FIG. 3C is a sectional view of the bracket shown in FIG. 3A in which a thermostat is inserted in a recess thereof.

Referring to FIG. 3C, thermostat TH is inserted in recess 4, and is pressed down by a crossing bar 8 crossing over recess 4, and then fixed therein by an element such as a screw **8*a* or a bolt inserted through a corner of crossing bar 8 to be engaged in screw hole 7**.

Figure 4A:
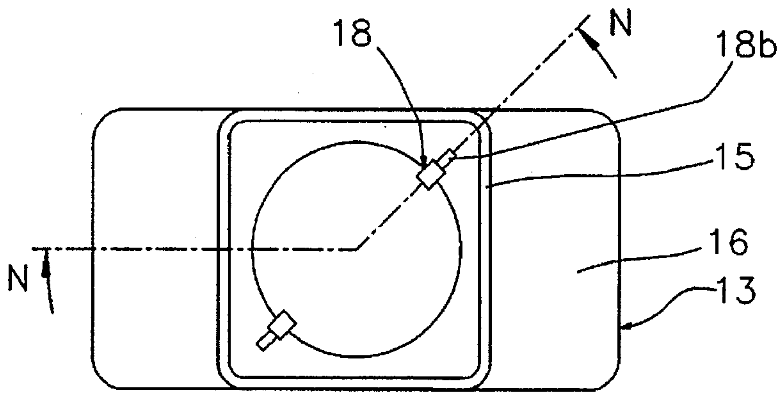
FIG. 4A is a plan view of a bracket according to another embodiment of the present invention.
Figure 4B:
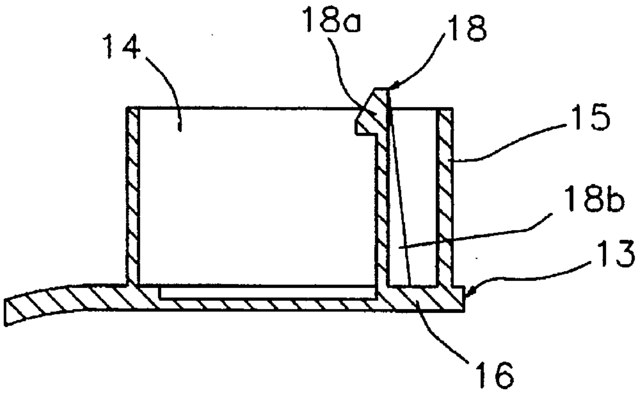
FIG. 4B is a sectional view of the bracket taken along line N—N in FIG. 4A.

FIGS. 4A and 4B are plan and sectional views of a bracket 13 according to another embodiment of the present invention. Bracket 13 of the present embodiment is similar to bracket 3 shown in FIGS. 3A and 3B except that bracket 13 has two hooks 18 disposed in a recess 14 instead of screw hole 7 and crossing bar 8. That is, bracket 13 has a main body 15 and a base plate 16. Main body 15 has a recess 14 formed at the central part thereof and the rear surface of base plate 16 is curved in such a manner to be attached to the outer surface of high voltage transformer T2 suitably. In recess 14 are disposed two elastic hooks 18, each of which has a protuberance **18*a* formed at the upper free end thereof and a reinforcement girder 18*b*** provided at the back thereof.

Figure 4C:
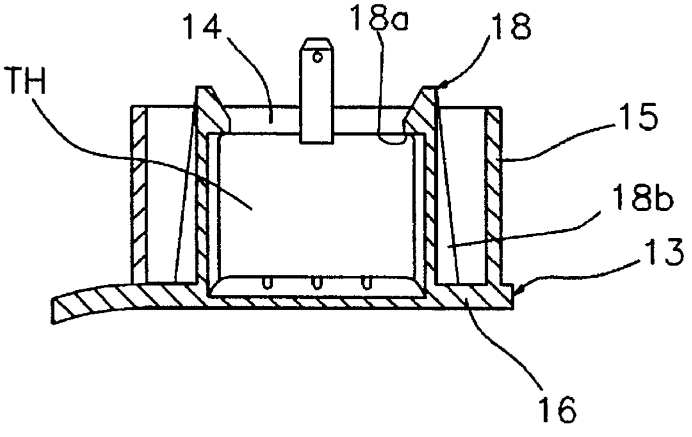
FIG. 4C is a sectional view of the bracket shown in FIGS. 4A and 4B in which a thermostat is inserted in a recess thereof.

Referring to FIG. 4C, thermostat TH is inserted between two elastic hooks 18 in recess 14, and fixed therein by two elastic hooks 18.

In devices for preventing a high voltage transformer of a microwave oven from being overheated having the above-described constructions, two contact points P1 and P2 of thermostat TH are maintained to be connected with each other so as to guarantee a stable power supply to first coil L3 and thereby normal operations of high voltage transformer T2 and magnetron M2, when high voltage transformer T2 is below a predetermined temperature.

In the meantime, when high voltage transformer T2 is overheated to be over the predetermined temperature, two contact points P1 and P2 are separated from each other and the power supply to first coil L3 is interrupted, and accordingly the normal operations of high voltage transformer T2 and magnetron M3 are stopped.

Again, when high voltage transformer T2 is cooled to be below the predetermined temperature, contact points P1 and P2 are restored to be connected with each other, and thereby the electric power is supplied to first coil L3 again.

As described above, in a device for preventing a high voltage transformer of a microwave oven from being overheated according to the present invention, the temperature of the transformer is not estimated through an indirect method such as a measurement of the quantity of an electric current flowing through the second coil but sensed directly by the thermostat responding the temperature. Accordingly, the high voltage transformer is prevented from being overheated in a stable and reliable manner.

Further, because the power supply circuit of the magnetron is automatically switched to be opened or closed according to the temperature, troubles of replacing damaged components such as a high voltage fuse with new ones whenever the circuit is opened can be avoided and the expense for maintaining the transformer can be reduced.

Furthermore, in a device for preventing a high voltage transformer of a microwave oven from being overheated according to the present invention, because the thermostat is connected to the first coil of the high voltage transformer, components for low voltage, which are much cheaper than components of high voltage, can be adopted for the thermostat, terminals of the thermostat, and other components. Accordingly, the manufacturing cost of the device can be reduced compared with the conventional device in which a high voltage fuse is connected to the second coil.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A device for preventing a high voltage transformer of a microwave oven from being overheated, comprising:

a high voltage transformer having a first coil to which an alternating current having a first voltage is supplied, and a second coil at which a second voltage higher than the first voltage is induced;

a generator circuit for generating an ultra microwave by the second voltage applied thereto from the second coil, and for radiating the ultra microwave into a heating chamber of the microwave oven;

a thermostat connected to one of two terminals of the first coil and disposed on an outer surface of the second coil;

a bracket that provides electric insulation of the thermostat from the second coil, comprising:.

a main body having a recess formed at a central part thereof; and a base plate attached on the second coil to support the main body and a means for fixing the thermostat in the recess, wherein the thermostat is installed on the second coil by being inserted in the bracket and the fixing means comprises:

a screw hole formed at an inner corner of the recess;

a crossing bar crossing over the recess for pressing down the thermostat in the recess; and an assembling means inserted through one end of the crossing bar to be engaged in the screw hole.

2. A device for preventing a high voltage transformer of a microwave oven from being overheated as claimed in claim 1, wherein the generator circuit comprises:

a magnetron electrically connected to the second coil to radiate an ultra microwave into a heating chamber of the microwave oven;

a condenser disposed between the magnetron and the second coil to be connected in series to them; and a high voltage diode connected in parallel to the magnetron.

3. The device for preventing a high voltage transformer of a microwave oven from being overheated as claimed in claim 1, wherein the bracket comprises an insulation material selected from a group consisting of polybuthylene terephthalate and a phenol resin, and the bracket is attached on an outer surface of the second coil.

4. The device for preventing a high voltage transformer of a microwave oven from being overheated as claimed in claim 1, wherein the base plate has a rear surface which has a curved contour corresponding to an outer surface of the high voltage transformer.

5. The device for preventing a high voltage transformer of a microwave oven from being overheated as claimed in claim 1, wherein the assembling means is a bolt or a screw.

6. A device for preventing a high voltage transformer of a microwave oven from being overheated comprising:

a high voltage transformer having a first coil to which an alternating current having a first voltage is supplied, and a second coil at which a second voltage higher than the first voltage is induced;

a generator circuit including a magnetron electrically connected to the second coil to radiate an ultra microwave into a heating chamber of the microwave oven, a high voltage condenser disposed between the magnetron and the second coil to be connected in series to them, and a high voltage diode connected in parallel to the magnetron; and a thermostat connected to one of two terminals of the first coil and disposed on an outer surface of the second coil after being inserted in a bracket for electric insulation from the second coil, wherein the bracket is made of an insulation material selected from a group consisting of polybuthylene terephthalate and a phenol resin; is attached on an outer surface of the second coil; includes a main body having a recess formed at a central part thereof, a base plate supporting the main body and having a rear surface which has a curved contour corresponding to an outer surface of the high voltage transformer, a crossing bar crossing over the recess for pressing down the thermostat in the recess, and a bolt or a screw inserted through one end of the crossing bar to be engaged in a screw hole.

7. A device for preventing a high voltage transformer of a microwave oven from being overheated comprising:

a high voltage transformer having a first coil to which an alternating current having a first voltage is supplied, and a second coil at which a second voltage higher than the first voltage is induced;

a generator circuit including a magnetron electrically connected to the second coil to radiate an ultra microwave into a heating chamber of the microwave oven, a high voltage condenser disposed between the magnetron and the second coil to be connected in series to them, and a high voltage diode connected in parallel to the magnetron; and a thermostat connected to one of two terminals of the first coil and disposed on an outer surface of the second coil after being inserted in a bracket for electric insulation from the second coil, wherein the bracket is made of an insulation material selected from a group consisting of polybuthylene terephthalate and a phenol resin; is attached on an outer surface of the second coil includes a main body having a recess formed at a central part thereof, a base plate supporting the main body and having a rear surface which is curved in such a manner to be suitably attached on an outer surface of the high voltage transformer, and two elastic hooks disposed in the recess, each of the hooks having a protuberance formed at an upper free end thereof, and a reinforcement girder provided at a rear surface thereof.

8. A device for preventing a high voltage transformer of a microwave oven from being overheated, comprising:

a high voltage transformer having a first coil to which an alternating current having a first voltage is supplied, and a second coil at which a second voltage higher than the first voltage is induced;

a generator circuit for generating an ultra microwave by the second voltage applied thereto from the second coil, and for radiating the ultra microwave into a heating chamber of the microwave oven;

a thermostat connected to one of two terminals of the first coil and disposed on an outer surface of the second coil; and a bracket that provides electric insulation of the thermostat from the second coil, having:

a main body having a recess formed at a central part thereof; and a base plate attached on the second coil to support the main body and a means for fixing the thermostat in the recess, wherein the thermostat is installed on the second coil by being inserted in the bracket; and the fixing means comprises two elastic hooks disposed in the recess.

9. The device for preventing a high voltage transformer of a microwave oven from being overheated as claimed in claim 8, wherein each of the hooks comprises a protuberance formed at an upper free end thereof, and a reinforcement girder provided at a rear surface thereof.

* * * * *